US007655191B2

(12) United States Patent
Diamond et al.

(10) Patent No.: US 7,655,191 B2
(45) Date of Patent: Feb. 2, 2010

(54) METHODS FOR CHEMICAL REACTIONS IN A PARALLEL BATCH REACTOR

(75) Inventors: Gary M. Diamond, Menlo Park, CA (US); Keith A. Hall, San Jose, CA (US); Thomas Harding McWaid, Fremont, CA (US); Vince Murphy, San Jose, CA (US); Michael Myslovaty, San Jose, CA (US); James A. W. Shoemaker, Gilroy, CA (US); Robbie Singh Sidhu, Fremont, CA (US); Howard Turner, Campbell, CA (US); Eric Dias, Belmont, CA (US); Mikhail Spitkovsky, Sunnyvale, CA (US)

(73) Assignee: Symyx Solutions, Inc., Sunnyvale, CA (US)

( * ) Notice: Subject to any disclaimer, the term of this patent is extended or adjusted under 35 U.S.C. 154(b) by 360 days.

(21) Appl. No.: 11/803,224

(22) Filed: May 14, 2007

(65) Prior Publication Data

US 2008/0286174 A1    Nov. 20, 2008

(51) Int. Cl.
*B01J 19/00* (2006.01)
*B01J 3/00* (2006.01)
*G01N 1/00* (2006.01)

(52) U.S. Cl. .................. 422/129; 422/99; 422/100; 422/102; 422/112; 422/130; 422/196; 422/242; 436/174

(58) Field of Classification Search .............. 422/129, 422/99, 100, 102, 112, 130, 196, 242; 436/174
See application file for complete search history.

(56) References Cited

U.S. PATENT DOCUMENTS 3,617,033 A    11/1971    Ichikawa et al.

3,881,872 A    5/1975    Naono (Continued)

FOREIGN PATENT DOCUMENTS

EP    0402018 A1    12/1990

(Continued)

OTHER PUBLICATIONS

Grunwald et al., "Investigation of Coolant Mixing in Pressurized Water Reactors at the Rossendorf Mixing Test Facility Rocom".

(Continued)

*Primary Examiner*—Walter D Griffin
*Assistant Examiner*—Huy-Tram Nguyen
(74) *Attorney, Agent, or Firm*—Cindy Kaplan

(57) ABSTRACT

In one embodiment, a parallel batch reactor generally includes a plurality of reactor vessels and a plurality of valves configured to allow flow into the reactor vessels when a gas is supplied to the reactor at a pressure higher than a pressure within the reactor vessels and restrict flow from the reactor vessels. A method includes inserting chemical components into the reactor vessels, supplying a first gas to the reactor vessels to pressurize the reactor vessels, stopping supply of the first gas, and supplying a second gas to the reactor at a lower pressure than a pressure within the reactor vessels. The second gas passes through the valves and into the reactor vessels when the pressure within the reactor vessels drops below the pressure of the second gas.

21 Claims, 13 Drawing Sheets

U.S. PATENT DOCUMENTS

| | | | |
|---|---|---|---|
| 4,000,492 | A | 12/1976 | Willens |
| 4,180,943 | A | 1/1980 | Smith et al. |
| 4,493,815 | A | 1/1985 | Fernwood et al. |
| 4,895,706 | A | 1/1990 | Root et al. |
| 4,927,604 | A | 5/1990 | Mathus et al. |
| 4,990,076 | A | 2/1991 | Lynch et al. |
| 5,011,779 | A | 4/1991 | Maimon |
| 5,035,866 | A | 7/1991 | Wannlund |
| 5,183,564 | A | 2/1993 | Hong |
| 5,190,666 | A | 3/1993 | Bisconte |
| 5,190,734 | A | 3/1993 | Frushour |
| 5,205,845 | A | 4/1993 | Sacks et al. |
| 5,246,665 | A | 9/1993 | Tyranski et al. |
| 5,324,483 | A | 6/1994 | Cody et al. |
| 5,428,118 | A | 6/1995 | Painter et al. |
| 5,443,791 | A | 8/1995 | Cathcart et al. |
| 5,516,490 | A | 5/1996 | Sanadi |
| 5,529,756 | A | 6/1996 | Brennan |
| 5,544,683 | A | 8/1996 | Guhl |
| 5,593,642 | A | 1/1997 | DeWitt et al. |
| 5,624,815 | A | 4/1997 | Grant et al. |
| 5,716,584 | A | 2/1998 | Baker et al. |
| 5,746,982 | A | 5/1998 | Saneii et al. |
| 5,766,556 | A | 6/1998 | DeWitt et al. |
| 5,792,430 | A | 8/1998 | Hamper |
| 5,846,396 | A | 12/1998 | Zanzucchi et al. |
| 5,897,842 | A | 4/1999 | Dunn et al. |
| 6,027,694 | A | 2/2000 | Boulton et al. |
| 6,042,789 | A | 3/2000 | Antonenko et al. |
| 6,045,755 | A | 4/2000 | Lebl et al. |
| 6,063,633 | A | 5/2000 | Willson, III |
| 6,106,783 | A | 8/2000 | Gamble |
| 6,132,686 | A | 10/2000 | Gallup et al. |
| 6,171,555 | B1 | 1/2001 | Cargill et al. |
| 6,190,619 | B1 | 2/2001 | Kilcoin et al. |
| 6,250,707 | B1 | 6/2001 | Dintner et al. |
| 6,264,891 | B1 | 7/2001 | Heyneker et al. |
| 6,309,608 | B1 | 10/2001 | Zhou et al. |
| 6,376,256 | B1 | 4/2002 | Dunnington et al. |
| 6,410,332 | B1 | 6/2002 | Desrosiers et al. |
| 6,485,692 | B1 | 11/2002 | Freitag et al. |
| 6,537,500 | B1 | 3/2003 | Brenner et al. |
| 6,572,828 | B1 | 6/2003 | Potyrailo et al. |
| 6,692,708 | B2 * | 2/2004 | Chandler, Jr. ............ 422/225 |
| 6,770,482 | B1 | 8/2004 | Flanagan et al. |
| 6,924,149 | B2 * | 8/2005 | Turner et al. ............ 436/148 |
| 7,018,589 | B1 | 3/2006 | Van Erden et al. |
| 7,045,358 | B2 * | 5/2006 | Chandler, Jr. ............ 436/34 |
| 7,141,218 | B2 | 11/2006 | Van Erden et al. |
| 7,335,513 | B2 * | 2/2008 | Smith et al. ............ 436/180 |
| 2003/0128626 | A1 | 7/2003 | Verkerk |
| 2003/0156989 | A1 * | 8/2003 | Safir et al. ............ 422/99 |
| 2004/0013565 | A1 | 1/2004 | Bosch et al. |
| 2004/0151641 | A1 | 8/2004 | Van Erden et al. |
| 2005/0169815 | A1 * | 8/2005 | van den Brink et al. ...... 422/130 |

FOREIGN PATENT DOCUMENTS

| | | |
|---|---|---|
| EP | 1 256 378 A | 11/2002 |
| EP | 1923132 A1 | 5/2008 |
| WO | WO 97/32208 | 9/1997 |
| WO | WO 97/45443 | 12/1997 |
| WO | WO 98/15813 | 4/1998 |
| WO | WO 98/36826 | 8/1998 |
| WO | WO 00/03805 | 1/2000 |
| WO | WO 00/09255 A2 | 2/2000 |
| WO | WO 01/14529 | 3/2000 |
| WO | WO 01/00315 | 1/2001 |
| WO | WO 01/05497 | 1/2001 |
| WO | WO 01/93998 A | 12/2001 |
| WO | WO 2007/020864 A1 | 2/2007 |

OTHER PUBLICATIONS

Heiszwolf, Johan J. "runaway in Stirred Tanks", http://www.dct.tudelft.nl/monoliet/heiszwolf/runaway.html.

http://www.louisville.edu/speed/Mixing_Lab.htm.

http://www.epa.gov/ORD/NRMRL/Pubs/2001/water/600r01021c2/pdf/.

http://www.onlineconversion.com/.

Product Brochure for Radleys Titan Specialist Micro Titer Plates, 8 pages.

Christian Hoffmann, Anne Wolf and Ferdi Schuth, "Parallel Synthesis and Testing of Catalysts under Nearly Conventional Testion Conditions", Angew. Chem. Int. 1999, 38, No. 18.

Product Brochure "Calypso System Valve Base Reaction Frame", Charybdis Technologies, Inc.

Product Brochure "ARES Pressure Reactors for Combinatorial Chemistry".

* cited by examiner

METHODS FOR CHEMICAL REACTIONS IN A PARALLEL BATCH REACTOR

BACKGROUND OF THE INVENTION

The present disclosure relates generally to parallel batch reactors for screening arrays of materials.

The discovery of new materials with novel chemical and physical properties often leads to the development of new and useful technologies. High-throughput or combinatorial technologies are often used to accelerate the speed of research, maximize the opportunity for breakthroughs, and expand the amount of available information. The use of combinatorial technologies allows high density libraries of very large numbers of materials to be created using parallel or rapid serial synthesis. High-throughput screens are used to test these materials for desired properties to identify compounds, formulations, or materials of interest.

Parallel or rapid serial synthesis allows different compounds, materials, or formulations to be synthesized in separate vessels, often in an automated fashion. Devices have been developed for automating combinatorial, parallel or rapid serial synthesis. One such device includes reaction blocks containing multiple reaction vessels. The ability to conduct meaningful experiments in homogeneous catalysis using these types of devices is dependent on the ability to achieve sufficient control over temperature, pressure, reagent concentrations and ratios, and reaction homogeneity. This is especially challenging for catalysts that produce products that can impart significant changes in the phase or composition of the reaction medium. For example, in homogeneous olefin polymerization, polymers that can precipitate from or increase the viscosity of the reaction mixture can significantly impact the nature and number of accessible active catalyst sites and also prevent efficient mass transfer of gaseous reagents into the reaction, which can mask the true performance of a catalyst.

The inability to adequately control reactions can introduce significant uncertainties in interpreting catalyst performance and lead to false-negative or false-positive results. It is therefore important to have the ability to control the extent of reactions and quench the reactions appropriately. For example, in order to maintain reaction homogeneity, viscosity, and control of the overall composition of the reaction mixture, it is important to control the extent of the reaction by quenching the reaction mixture before the reaction is allowed to produce too much product. In addition, proper quenching of reactions can help prevent subsequent unwanted side reactions involving the desired products.

In order to monitor pressure changes during reactions and add components after a predetermined pressure change, the pressure within reactor vessels is monitored. A commonly used pressure monitoring system includes pressure sensors positioned within a reactor vessel or fluid passageway to measure the internal pressure of the vessel. This limits the type of pressure sensors that can be used.

SUMMARY

Methods for effecting chemical reactions in a parallel batch reactor are disclosed. In one embodiment, the parallel batch reactor generally comprises a plurality of reactor vessels and a plurality of valves configured to allow flow into the reactor vessels when a gas is supplied to the reactor at a pressure higher than a pressure within the reactor vessels and restrict flow from the reactor vessels. A method includes inserting chemical components into the reactor vessels, supplying a first gas to the reactor vessels to pressurize the reactor vessels, stopping supply of the first gas, and supplying a second gas to the reactor at a lower pressure than a pressure within the reactor vessels. The second gas passes through the valves and into the reactor vessels when the pressure within the reactor vessels drops below the pressure of the second gas.

In another embodiment, the parallel batch reactor generally comprises a plurality of reactor vessels and a plurality of valves operable to supply pressurized fluid to the reactor vessels and fluidically isolate each of the reactor vessels. A method includes supplying a gas to the parallel batch reactor to pressurize the reactor vessels, stopping supply of the gas to fluidically isolate each of the reactor vessels, sampling chemical components from one or more of the pressurized reactor vessels, and performing one or more processes based on an analysis of the sampled chemical components.

BRIEF DESCRIPTION OF THE DRAWINGS

Corresponding reference characters indicate corresponding parts throughout the several views of the drawings.

DESCRIPTION OF EXAMPLE EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A parallel batch reactor for use in performing high-throughput screening is disclosed herein. The reactor may be used to perform parallel or rapid serial synthesis or screening of materials or formulations, or other experimentation involving reactions of multiple components. For example, the reactor may be utilized for reactions where one or more components are a gas such as hydrogenations, carbonylations, oxidations, and polymerizations involving gaseous monomers. The reactor may also be used with homogeneous or heterogeneous catalysts (i.e., catalysts which enable catalytic reactions to occur with the reactants and catalysts residing in different phases (e.g., solid/liquid, solid/gas, liquid/gas)), polymerization or co-polymerization reactions producing potentially insoluble polymer products or changes in solution viscosity (e.g., polyolefin and butyl rubber polymerizations), or oligomerization reactions producing volatile products. The reactants may comprise chemical components that include any chemical species (solid, liquid, or gas) that are part of an experimental design, and may include, but are not limited to, solvents, ligands, metal complexes such as metal precursors, activators, monomers, catalysts, catalyst precursors, co-catalysts, scavengers, or other similar chemistry. The reactor may also be used for studying slurry phase reactions involving supported catalysts. The reactor may be used for synthesizing catalysts such as, for example, Ziegler-Natta catalysts for olefin polymerization. As described below, the reactor allows control over solution phase reactions such as copolymerization reactions involving, for example, ethylene and $\alpha$-olefins. It is to be understood that the applications described herein are merely examples for uses of the reactor and that the reactor may be used for other applications without departing from the scope of the invention.

Figure 1:
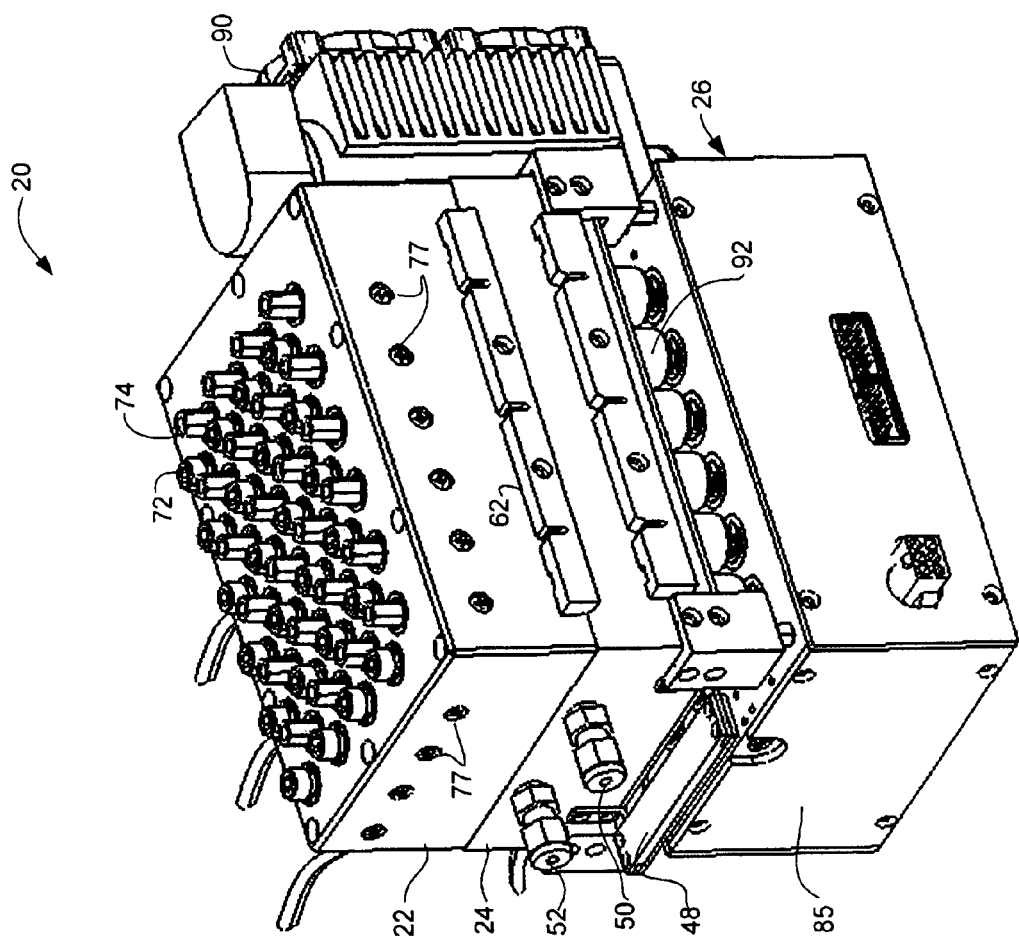
FIG. 1 is a perspective of one embodiment of a parallel batch reactor.
Figure 2:
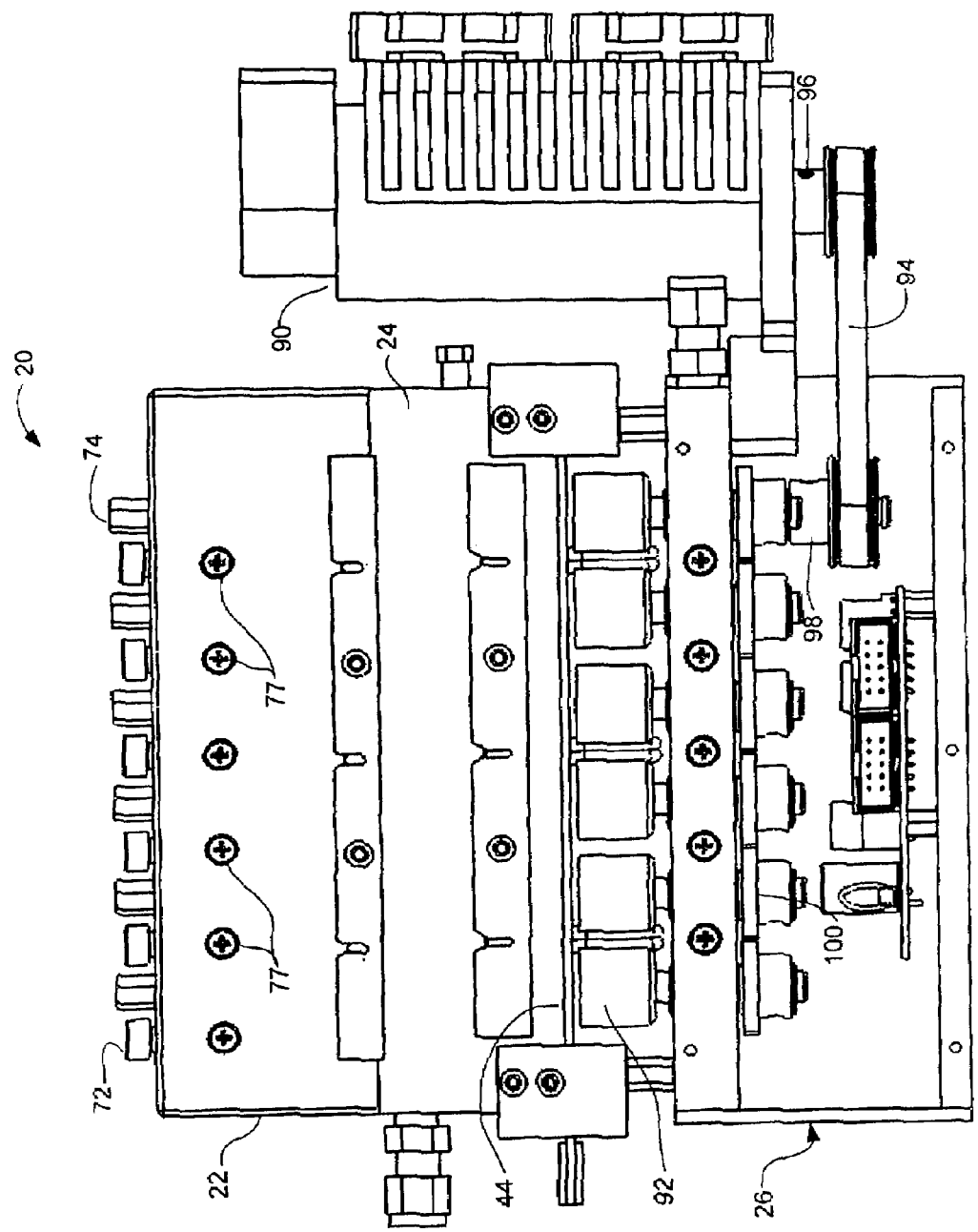
FIG. 2 is a side view of the reactor of FIG. 1.

Referring now to the drawings, and first to FIGS. 1 and 2, one embodiment of a parallel batch reactor is shown and generally indicated at 20. The reactor comprises a reactor block mounted above a stirring system, generally indicated at 26. The reactor block comprises a fluid distribution manifold (valve block) 22 which holds a plurality of valves for pressurizing and transferring chemical components to reactor vessels (reaction volumes), and a vessel block (holder) 24 containing the reactor vessels. The manifold 22 and vessel block 24 are coupled together with bolts, screws, or other fastening mechanisms such as clips or clamps and o-rings or gaskets. As described below, the manifold 22 and vessel block 24 comprise a plurality of passageways interconnecting the valves with the reactor vessels. In a preferred embodiment, the valves comprise check valves 72 configured to transfer pressurized fluid to the reactor vessels and individually seal the reactor vessels, and injector/sampling valves 74 operable to receive and transfer chemical components to and from the reactor vessels.

Figure 3:
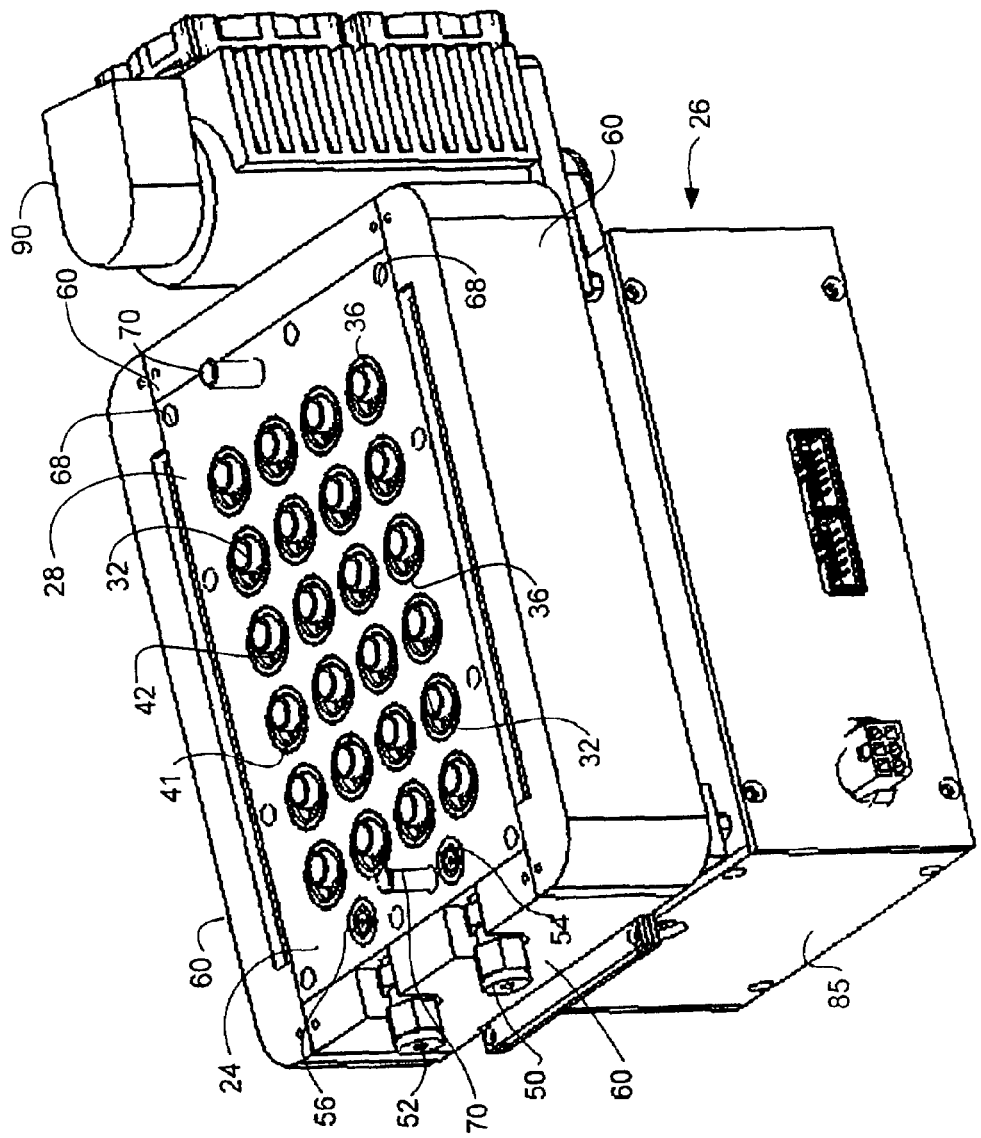
FIG. 3 is a perspective of the reactor of FIG. 1 with a manifold removed.
Figure 4:
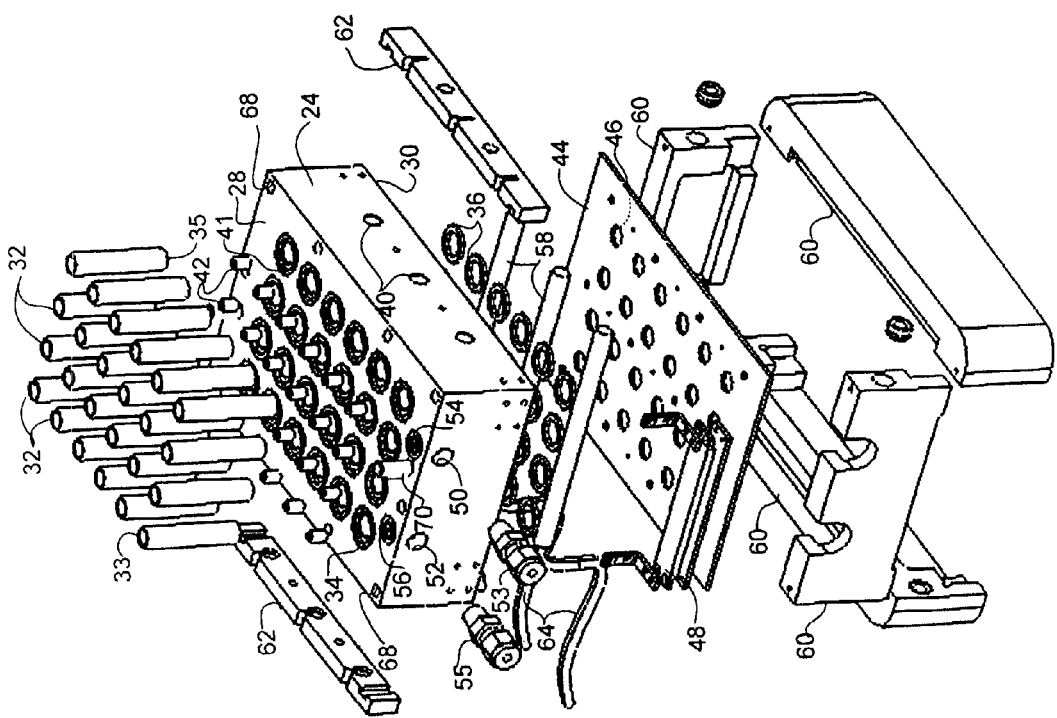
FIG. 4 is an exploded view of a portion of the reactor of FIG. 3.

FIGS. 3 and 4 illustrate additional details of the vessel block 24. FIG. 3 shows the reactor system with the manifold 22 removed and FIG. 4 is an exploded view of the vessel block 24 showing internal components of the block. The vessel block 24 includes a plurality of passageways (wells) extending from an upper surface 28 of the vessel block to a lower surface 30 of the vessel block (FIG. 4). In the embodiment shown in FIG. 4, a pressure monitoring plate 44 seals the bottom openings of the vessel block, thereby defining an array of reaction volumes (vessels). The plate 44 is attached to vessel block 24 using standard fasteners such as screws. Sealing can be achieved using standard o-ring or gasket technology. In the embodiment shown in FIG. 4, removable vials are inserted into the reactor vessels (reaction volumes) 32. It is to be understood that the reactor vessels may also be defined by the wells formed within the vessel block or formed by an array of individual vessels which define the vessel block. The reactor vessels (reaction volumes) 32 have an open upper end 33 for receiving reactants (e.g., catalysts, initiators, solvents) and a lower closed end 35. The vessels 32 may be made of any appropriate material that is inert to the reaction being conducted, including plastic, glass, metal, etc.

The reactor may contain any number of reaction volumes arranged in any desired pattern or array. The embodiment shown has 24 wells arranged in a 4×6 array. The overall size of the reactor and the volume of the reactor vessels influence the number of wells that can be efficiently utilized. In the reactor shown in FIG. 4, the array or library comprises 24 separate reactions. In other embodiments, there may be only 6 reactions. In still other embodiments, there are at least 48, 96, or 384 or more different reactions. A 96 well reactor may correspond to a standard microtiter plate format, namely an 8 by 12 array of wells with 9 mm spacing. The reaction volumes may all be the same size or one or more volumes may be different. For example, the vessel block 24, can be interchanged with another vessel block having one or more reactor vessels configured to hold a different volume of fluid. Also, the valve block 22 may be replaced with a block that seals the reaction volumes without valves. The stirrer system 26 may also be interchanged with a stirring system having a different stirring assembly or mechanism than shown and described herein.

Figure 6:
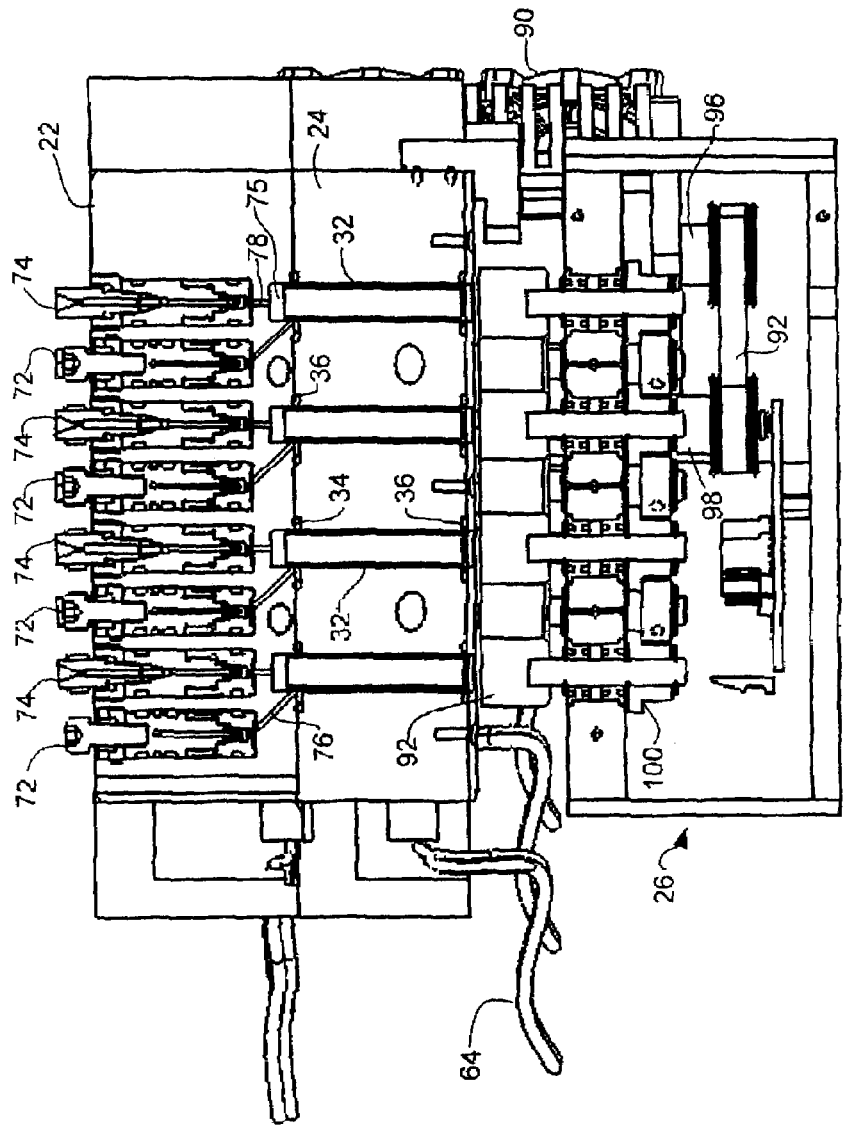
FIG. 6 is a cross-sectional view of the reactor taken in the plane including line 6-6 of FIG. 5.

The upper and lower surfaces 28, 30 of the vessel block 24 include a plurality of grooves 34 extending around a periphery of the wells for receiving a seal (o-ring) 36 (FIGS. 4 and 6). The properties (e.g., composition and size) of the seals can be selected to account for different sealing pressures, with the seal preferably withstanding a pressure in the reactor of up to about 1000 psig and temperature up to about 200° C. without leaking (i.e., significant loss of pressure). The seal material should be inert to the reaction conditions and chemicals in the reaction. The seals may be made, for example, from PTFE, neoprene, butyl or silicone rubber, TEFLON coated elastomer, VITON, expanded TEFLON, graphite, KALREZ, or any other suitable material.

In the embodiment shown in FIGS. 3 and 4, a small opening 41 is provided adjacent to each of the reactor vessels 32 for receiving a vial anchor 42. The vial anchor 42 stabilizes the reactor vessel 32 and prevents the vessel from moving during stirring of the reactants. The opening 41 may also provide a gas ballast to control effective head-space volume.

The vessel block 24 includes an inlet port 50 and an outlet port 52 coupled to fittings 53, 55, respectively. The fitting 53 is attached to a flexible hose or rigid tube (not shown) connected to a pressure supply device. A fill valve is preferably attached to the inlet port 50 to control the application of pressure to the vessels 32. The fill valve (not shown) may comprise a manual or an electronic pressure control valve. The pressure source may be an inert gas such as nitrogen, argon, or helium, or a reactive gas such carbon dioxide, air, hydrogen, oxygen, hydrogen chloride, ammonia, ethylene, propylene, or butene, for example. Mixtures of gases may also be used. Two passageways 54, 56 intersect with inlet and outlet passageways in valve block 24 (50 and 52, respectively), and are aligned with openings in the manifold 22 to transfer fluid to the manifold. The reactor may also include an opening for one or more pressure relief valves to prevent over pressurization of the vessels.

In the embodiment shown in FIG. 4, a pressure monitoring system 44 is positioned adjacent to the lower surface 30 of the vessel block 24 and comprises an array of pressure sensors. In the embodiment shown in FIG. 4, each of the removable vials 32 may contact a pressure monitoring plate 44 at a location of a pressure sensor 46. In another embodiment, pressure may be used to apply a force to the plate and pressure sensor 46. As described in detail below, the pressure sensors 46 are aligned with each of the reactor vessels to measure pressure changes within the reactor vessels. A bracket and clamp assembly 48 is attached to the reactor block 24 to hold a ribbon wire (not shown) coupled to the pressure sensors 46 (described below).

Heating elements (e.g., rods, cartridges) 58 are inserted into openings 40 extending from one side of the vessel block 24 to an opposite side of the vessel block (FIG. 4). The heating cartridges 58 are coupled to a controller operable to control heating of the reactor. In an alternative embodiment, a heating device may be used to supply additional heat to valve block 24 or heat valve block 24 separately from manifold 22. Also, other types of heating systems may be used without departing from the scope of the invention. The reactor may also be configured to cool the reactor vessels. For example, passageways 40 may be used to cool the reactor using, for example, a circulating fluid based chiller, thermoelectric cooler such as a peltier device or other cooling device. The reactor block may include temperature sensors (not shown) in thermal contact with the individual reactor vessels 32 or positioned within the reactor block. Suitable temperature sensors include thermocouples and thermistors. The temperature sensors preferably communicate with a temperature monitor that may provide input to the controller to provide closed loop temperature control (described below with respect to FIG. 14).

As shown in FIGS. 3 and 4, insulating plates 60 may be attached to the exterior walls of the vessel block 24 to reduce heat loss from the vessel block. The insulating plates 60 include openings as required to accommodate inlet tubes, etc. Guide plates 62 provide support for electrical wires (e.g., heating system wires 64) coupled to the reactor block.

The vessel block 24 includes a plurality of openings 68 along a periphery edge of the block for receiving bolts, screws, or other fasteners used to attach the vessel block 24 to the manifold 22 and optionally the stirring assembly 26. Two dowel pins 70 are attached at opposite ends of the vessel block 24 for aligning the vessel block with the manifold 22 (FIG. 3).

Figure 5:
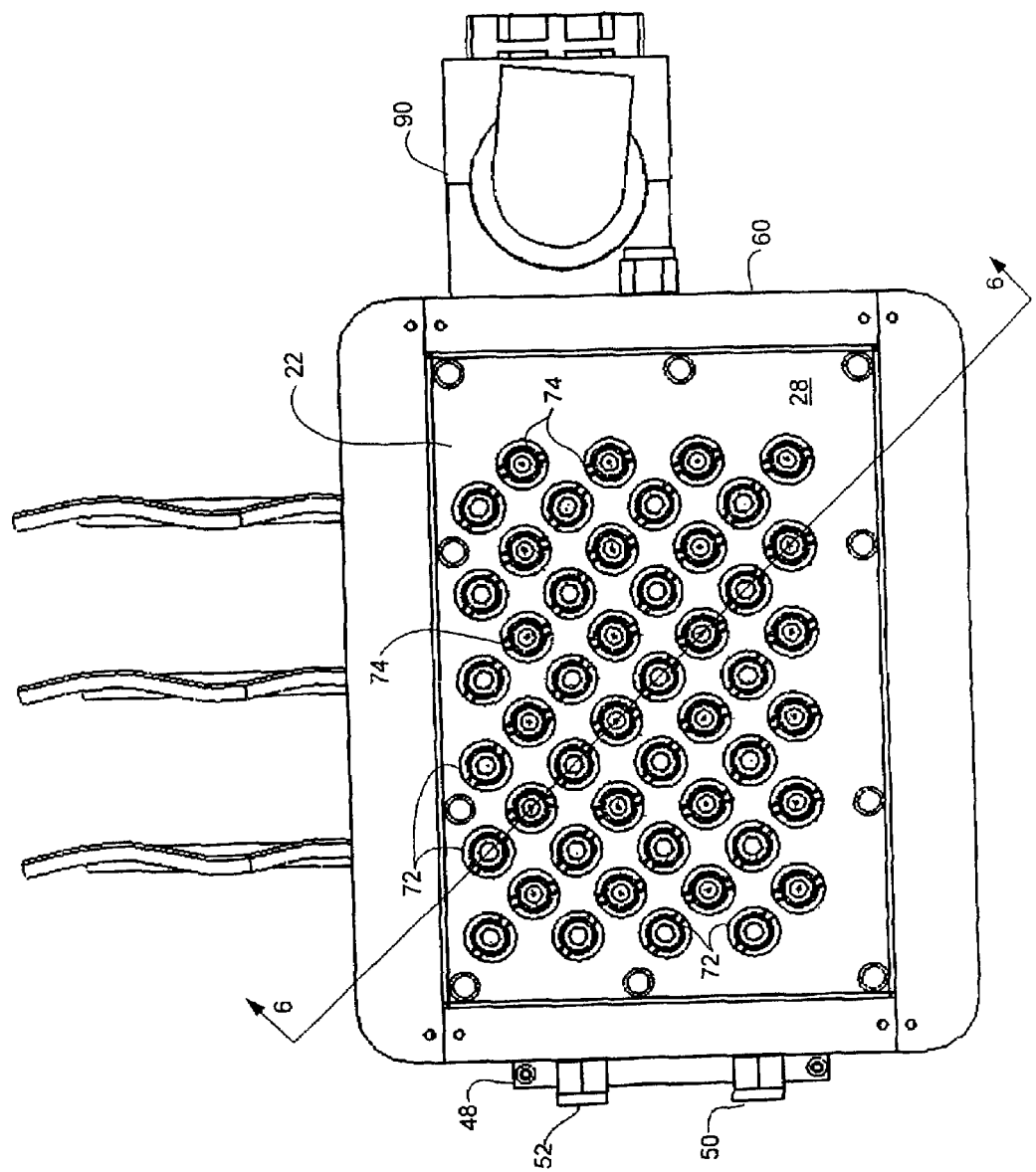
FIG. 5 is a plan view of the reactor of FIG. 1.
Figure 7:
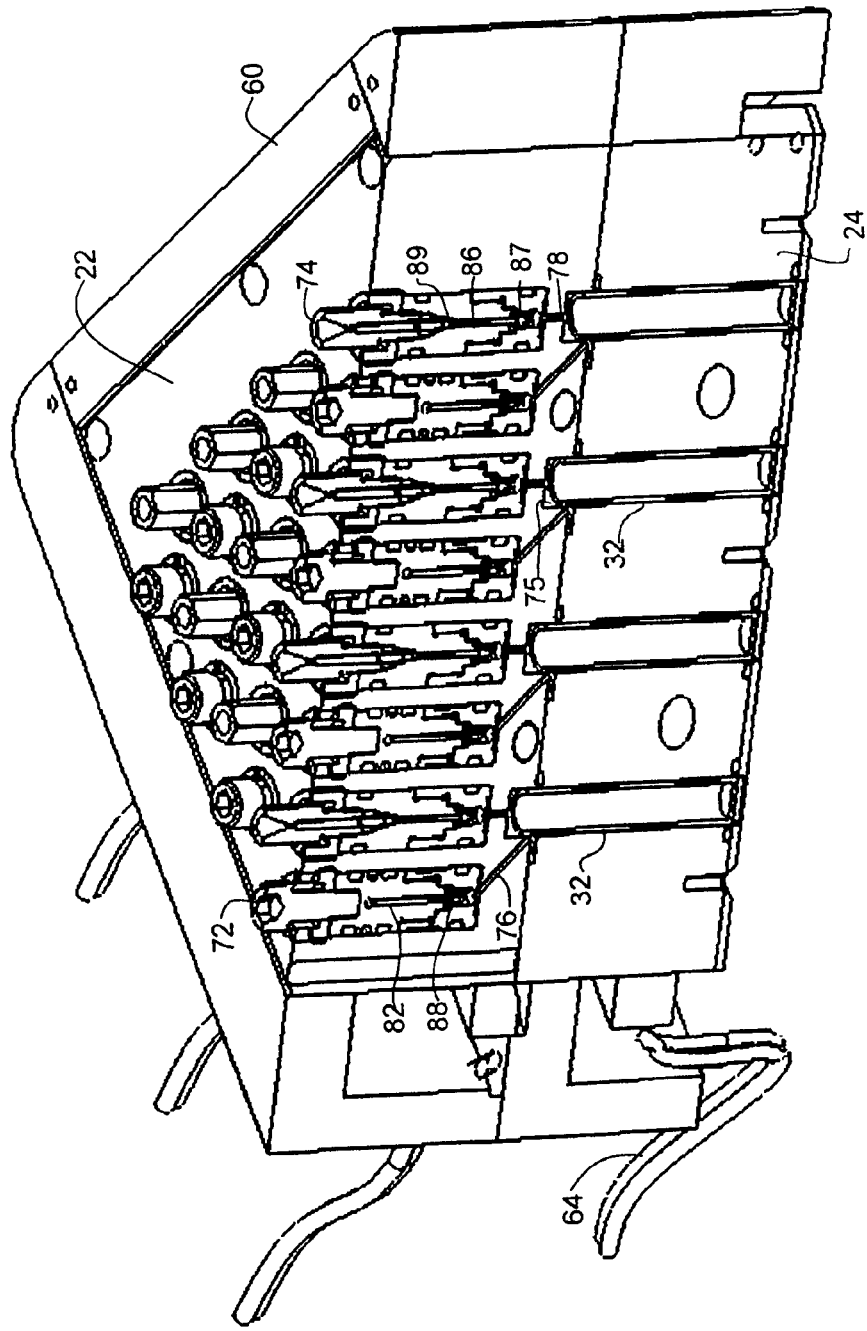
FIG. 7 is a cross-sectional perspective of a portion of the reactor.

The manifold 22 is shown in plan view in FIG. 5 and in cross-section in FIGS. 6 and 7. The manifold 22 includes a plurality of openings for receiving check valves 72 and injector/sampling valves 74. In the embodiment shown, the manifold 22 includes openings for 24 check valves and 24 injector/sampling valves, corresponding to the 24 reactor vessels 32. Each reactor vessel 32 therefore has an associated check valve 72 and injector/sampling valve 74. The check valves 72 allow flow into the reactor vessels 32 when a gas is supplied to the reactor at a pressure higher than a pressure within the reactor vessels, and restrict flow from the reactor vessels when the pressure within the reactor vessel is greater than the supplied pressure, thereby fluidically isolating each of the reactor vessels from one another. The fluidic isolation between vessels prevents chemical cross-talk or cross-contamination between vessels. In the embodiment shown and described herein, each reactor vessel 32 is isolated with one check valve 72, however, the reactor can be configured such that any number of reactor vessels (e.g., row of reactor vessels) may be pressurized together and exposed to a common head space while being isolated from one or more other reactor vessels. Also, the reactor may be configured to include multiple injector/sampling valves 74 for each reaction volume or may group a number of reactor volumes together for use of a single injector valve. It is to be understood that the valve block 22 shown herein is only one example. Also, additional valves (e.g., check valves) may be used within the fluid distribution manifold 22.

The injector/sampling valves 74 are used to inject chemical components into the reactor vessels or sample chemical components from the reactor vessels. The embodiment shown and described herein has one injector/sampling valve 74 for each of the reactor vessels 32. The manifold 22 includes a plurality of drilled passageways 76, 78 interconnecting the valves 72, 74, respectively, with their corresponding reactor vessels 32 (FIGS. 6 and 7). It is to be understood that the injector valves 74 may be replaced with an array of septa seals or other types of seals, without departing from the scope of the invention.

Figure 8:
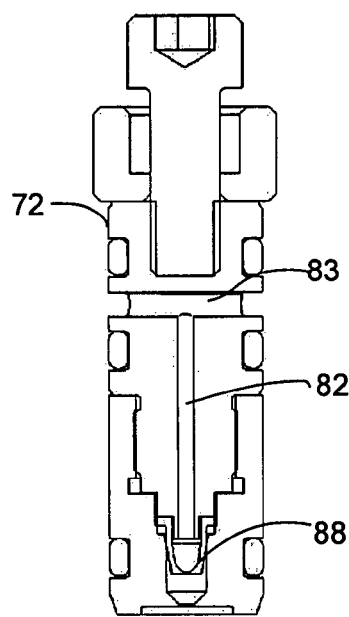
FIG. 8 is a cross-sectional view of one embodiment of a check valve.

The check valves 72 are interconnected by a series of cross drilled passageways 77 (FIG. 1). An insert is positioned within each opening to seal the passageways at the exterior of the manifold 22. Additional details of one embodiment of a check valve 72 are shown in FIG. 8. The check valve 72 comprises a longitudinal passageway 82 in fluid communication with a groove 83 and radial passageway (not shown) for receiving fluid from the cross drilled passageways 77 in the manifold 22. A lower end of the longitudinal passageway 82 contacts a one way valve 88 configured to open upon reaching a predefined pressure threshold. The valve 88 may be, for example, a duckbill check valve which allows unidirectional free flow with positive differential pressure. The fluid passageway 76 in manifold 22 extends from a lower end of the check valve 72 to the reactor vessel 32 (FIGS. 6 and 7).

Figure 9:
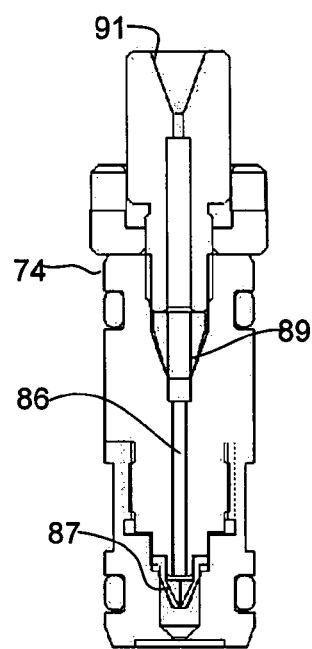
FIG. 9 is a cross-sectional view of one embodiment of an injector/sampling valve.

FIG. 9 illustrates one embodiment of the injector/sampling valve 74. The valve 74 comprises a tubular passageway 86 extending to a lower end in communication with a check valve 87. An upper end of the passageway 86 contacts a seal 89 which prevents fluid from flowing back out of the injector valve 74 when an injection or sampling needle or probe has been inserted through the seal. A needle (not shown) is inserted into the injector valve 74 through entry 91 (which acts as a needle guide), to contact the seal 89 and open valve 87 and inject components into or sample the reaction mixture within the reactor vessel 32. The injector/sampling valve 74 may also be used to sample gas or the reaction mixture in the reactor vessel by insertion of a fluid sampling probe through the injector valve and into the reactor vessel or fluid volume (headspace 75) above the reactor vessel. The seal 89 is provided for maintaining the reactor vessel sealed against ambient conditions when a needle or probe is inserted into and withdrawn from the reactor, thus preventing any substantial pressure losses if the reactor vessel is pressurized. Passageway 78 in manifold 22 extends from a lower end of the valve 74, which sits above the reactor vessel 32, to the reactor vessel (FIGS. 6 and 7). Passageway 78 may also include a tube such as a dip tube which extends into the reactor vessel 32 or reaction mixture.

It is to be understood that the valve configurations and arrangement shown and described herein are only one example and that other types of valves and configuration within the manifold 22 may be used without departing from the scope of the invention. For example, the manifold 22 may be split up into separate modules, each containing a portion of the valves 72, 74. In one example, the injector/sampling valves 74 may be contained within a first block and the check valves 72 contained in a second block to allow for a simple change out of the type of valves used in an experiment or replacement of failed or worn valves. Also, as noted above, the vessel block 24 may be interchanged with another vessel block comprising reactor vessels having different volumes. For example, a commercially available microtiter plate may be used as the vessel block 24.

The material of the reactor block is preferably selected to be chemically inert to the reaction of interest and allow the reactor to operate at elevated temperature (e.g., 50-200° C.)

and high pressure (e.g., 10-1000 psig). The reactor is preferably designed to withstand temperatures up to 200° C., but may also be configured to withstand higher temperatures. Also, as discussed above, the reactor may be cooled for use at sub-ambient temperature conditions. The reactor is preferably designed to withstand pressure substantially above atmospheric pressure. The reactor may also be configured to operate at a pressure of 15 psig, 20 psig, 30 psig, 40 psig, 100 psig, 300 psig, 500 psig, or 1000 psig, or other selected pressure.

The blocks 22, 24 may be formed from metal (e.g., aluminum, titanium, steel, Hastalloy) or polymer (e.g., nylon, Teflon), ceramic or any other suitable material. In one example, the reactor is to be operated at 300 psig and 150° C. (for gaseous monomer or reagent use) and 6061-T6 aluminum, which has been hard anodized is used. If the operating pressure is 1000 psig and operating temperature is 200° C., the material may be 17-4PH, H1100 stainless steel, or 6A1-4V titanium, for example. For some applications, the material may be coated or surface treated (e.g., anodization of Al or coating of Ti with titanium nitride). It is to be understood that the temperature or pressure applied to the reactor, or the materials used for the reactor may be different than the above examples without departing from the scope of the invention.

In the embodiment described herein, the reactor includes an optional stirring assembly 26 (FIGS. 1-3). Mixing variables such as rotation rate, and blade geometry may influence the course of a reaction and therefore affect the outcome of the reaction. In a preferred embodiment, a magnetic stirring system is used. Each reactor vessel 32 is oriented above a dedicated drive magnet. This arrangement provides improved mixing uniformity across the reactor. Referring to FIG. 2, the magnetic stirring system comprises a drive motor 90 coupled to an array of magnets The drive motor 90 is coupled to the magnet array via a belt 94 in contact with a drive shaft 96 extending from the drive motor and a drive shaft 98 coupled to the magnet array. Magnets 92 of the magnet array are each coupled to interlocking gears 100 which mechanically couple the magnets to the drive shaft 98. The magnets may also be coupled to each other using belts. The magnets 92 are arranged within the array so as to enable 360 degrees of rotation. When the magnets rotate they create a rotating magnetic field that interacts with stir elements (e.g., bars) located within the reactor vessels 32, and cause movement of the bars to stir the components of the reaction. The magnetic stir bar rests on the bottom of each reactor vessel 32 prior to operation. The magnetic stir bar attempts to align itself with the direction of the overall magnetic field of the corresponding magnet 92 and rotates as the magnet rotates. Rotation of the magnets 92 is preferably controlled by controlling the rotation rate of the drive motor 90 via a motor controller, as described below with respect to FIG. 14.

It is to be understood that the stirring system 26 described herein is only one example and changes to the stirring system may be made without departing from the scope of the invention. For example, different gears may be used to obtain variable stir speeds between reactor vessels using a single or multiple motor drivers. Also different motions of agitation may be used, the angle of the reactor vessels may vary with respect to the stirrer, or off-center stirring may be used to create asymmetric stirring.

In one embodiment, rare-earth stir bars are used (e.g., SmCo, NdFeB). Additional, other materials may be used to provide the magnetic component of the stir-bars, such as AlNiCo and ferromagnetic materials. The magnets can be coated or encapsulated with inert materials to maximize chemical compatibility. For instance, the magnets may be coated or encapsulated with parylene, chromium, nickel, Teflon, or PEEK. The material, shape, size, and geometry of the stir bars and stir bar coating may vary between reactor vessels 32 or experiments. In some instances the stir bar geometry might include a protrusion or "toe" that limits the contact area with the bottom of the reactor vessel to, for example, lower the inertia to stirring or limit mechanical abrasion or grinding of suspended particles such as heterogenized catalysts. It is to be understood that the stirring assembly shown and described herein is only one example and that other stirring systems such as an electromagnetic stirring system or a shaking system such as a vortexer may be used to mix reactants. As shown in FIG. 3, cover plates 85 may be placed over the stirring components to, for example, isolate and protect the components.

As discussed briefly above, the pressure monitoring system is used to monitor pressure or pressure changes within each of the reactor vessels 32. In accordance with one embodiment, the pressure system comprises an array of pressure sensors 46 mounted to the pressure monitoring plate 44 (FIG. 4). Each of the pressure sensors 46 are aligned with one of the reactor vessels 32. In the embodiment shown, the sensors 46 are mounted to the plate which is interposed between the sensors and reactor vessels. In another embodiment, the pressure sensors may be mounted directly to the reactor vessels.

Figure 10:
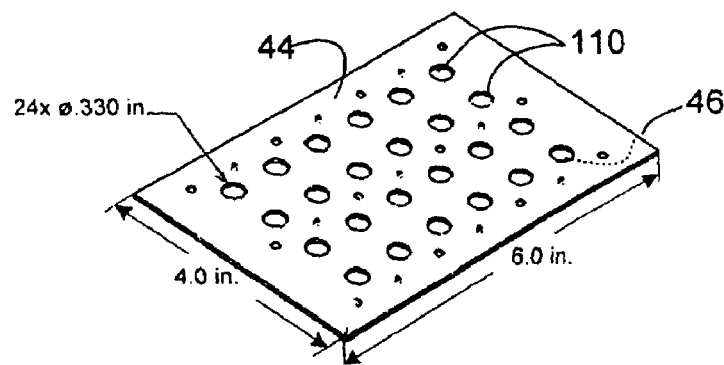
FIG. 10 is a perspective of one embodiment of a pressure monitoring plate for use in the reactor of FIG. 1.

One example of a pressure monitoring plate is shown in FIG. 10. The plate 44 comprises a plurality of thin walled regions (membranes) 110 configured to operate as flexible diaphragms. The thin walled regions 110 are positioned to align with the array of reactor vessels 32 within the vessel block 24. The pressure sensor 46 is mounted on the membrane on a lower surface of the plate to measure pressure within the reactor vessel. The pressure sensors are located external to the reactor vessels 32 and fluid passageways in fluid communication with the reactor vessels, which prevents the sensors from being exposed to chemical reagents within the reactor vessels. The membranes 110 may also be used as breakpoint (burst disk) to provide a path that directs fluid from the reactor in the case of over pressurization.

As the pressure within the reactor vessel increases, the corresponding membrane 110 deforms (FIGS. 4 and 10). The deformation of the membrane is measured by pressure sensor (transducer). Real-time monitoring of reactions is provided by the pressure sensors 46 which communicate with appropriate electronics (pressure monitoring) operable to power the transducers, and amplify signals received from the transducers. An optional processor receives pressure the amplified signals from the pressure monitor and converts the data into standard pressure units. The processor performs calculations on the data, which may include application of calibration curves and comparisons between the different reactor vessels 32.

The pressure monitoring plate 44 is preferably sufficiently thin so that the plate does not prevent the use of rotating magnets 92 located below the vessel block 24 to provide magnetic stirring, if magnetic stirring is used. Also, the location of the pressure sensor 46 adjacent to the bottom 35 of the reactor vessel 32 does not block access to the open upper end 33 of the reactor vessel. The plate 44 may be formed from aluminum or any other suitable material or combinations thereof. The dimensions of one example of a pressure monitoring plate 44 are shown on FIG. 10. The thin walled sections of the plate may be approximately 0.015 inches thick. The plate may also include alignment notches (or other markings) for use in positioning the plate 44 to align the sensors 46 with the reactor vessels 32. The plate may also be integral with the reactor block (i.e., plate defined by a planar lower surface of the reactor block 24) so that the pressure sensors are coupled directly to the reactor block. It is to be understood that the material and dimensions are only provided as an example and that plates and membranes having different shapes or sizes, or formed from different material may be used without departing from the scope of the invention.

Figure 11:
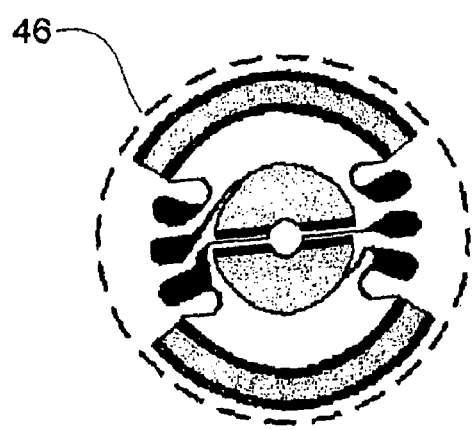
FIG. 11 is a diagram of one embodiment of a strain gage for use with the pressure monitoring plate of FIG. 10.

In a preferred embodiment, the pressure sensors 46 are planar sensors comprising strain gages. The strain gage measures the strain developed in the thin membrane 110 when the membrane is subjected to a pressure load through a change in electrical resistance. The strain gage transducer may employ a number of strain gage elements electrically connected to form a full or partial Wheatstone bridge circuit, for example. FIG. 11 illustrates one example of an arrangement of strain gage elements for use at sections 110 on the pressure monitoring plate 44. Many arrangement of wires or foil may be used to create the strain gage, as is well known by those skilled in the art. The pressure sensor is preferably configured with a resolution of approximately ±1 psi; however, the resolution may be greater or less than this value. The pressure sensing system may be configured to measure negative pressure such as a vacuum generated within the reaction volumes.

The strain gages may also be integrally formed in an array format on a polyimide sheet, for example. The sheet may contain the bias and signal leads, as well as any electrical shielding that is used. In one embodiment, the sheet is bonded to the bottom of the reactor block.

Figure 12:
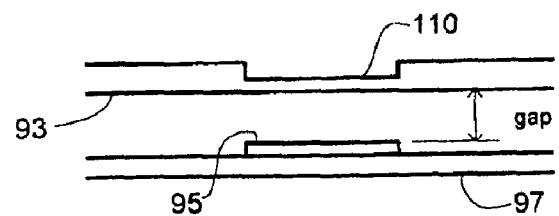
FIG. 12 is an enlarged diagram of one embodiment of a capacitance sensor for use with the pressure monitoring plate of FIG. 10.

In an alternative embodiment, capacitance sensing is used. In this embodiment, a change in capacitance is used to measure the deformation of a thin membrane supported along its perimeter when subjected to a distributed pressure load (FIG. 12). The membrane acts as one electrode 93 of the capacitor. A second electrode 95 is separated by a small gap (e.g., 500 μm) that functions as a dielectric and is attached to a printed circuit board (PCB) 97 completes the capacitor. The PCB preferably includes all of the traces, measurement chips, and connectors required to perform a capacitance measurement. The PCB may be attached to the bottom of the reactor block using standard fasteners. The capacitance of the sensor is a function of the dielectric constant of the material between the electrodes (e.g., air, nitrogen, or other material) and the size and separation of the electrodes. The capacitance sensor measures very small changes in the gap separating the electrodes.

Both the strain gage and capacitance based sensors may be configured with temperature compensation through the use of temperature sensors appropriately placed within the reactor vessels 32.

In an alternative embodiment, the pressure sensors (e.g., discrete strain gages) are mounted to the wall of the reactor vessels to measure the strain in the reactor vessel wall resulting from internal pressure changes in the reactor vessel.

The ability to monitor the pressure of individual reactor vessels as described above is useful in controlling a reaction. Changes in pressure can be used to determine when to quench a reaction. For example, in what is defined as an "active quench", when the pressure in the reactor vessel reaches a specified level, reagents are injected into the vessel to kill the catalyst.

Figure 13:
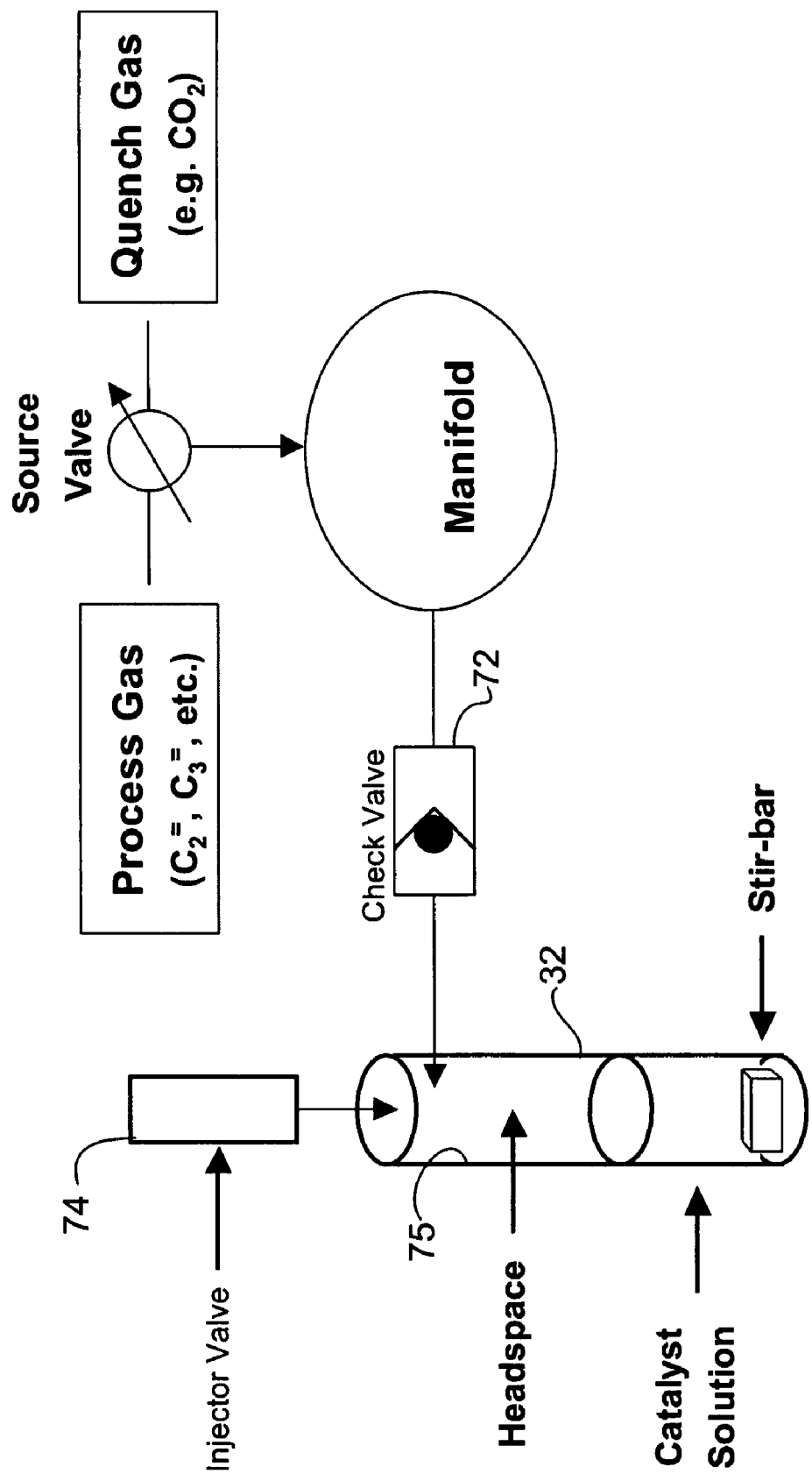
FIG. 13 is a schematic illustrating one embodiment of a reactor system for use in passive quenching.

An alternative method which does not require pressure monitoring is referred to herein as "passive quenching". FIG. 13 schematically illustrates an example of passive quenching using the reactor described herein. A process gas (first gas) (e.g., a polymerizable monomer) is supplied to the reactor vessels 32 by way of the fluid distribution manifold 24 and check valve 72, and the reaction mixture is allowed to reach equilibrium. The process gas is removed from the gas distribution manifold, thereby causing the check valves 72 to close and a quench gas (or another process gas) (second gas) (e.g., $CO_2$) is supplied to the manifold up to the check valves 72 at a lower pressure than the pressure within the reactor vessels. Reaction components such as activators or live catalysts are then injected into each reactor vessel. When the pressure in the reaction volume drops below the sum of the pressure in the manifold and the cracking pressure of the check valve, the quench gas passes through the check valve 72 and stops the reaction. Passive quenching permits quenching to occur based on a set differential pressure threshold of the check valve 72, and therefore is not dependent on pressure monitoring of the reactor vessel 32. The check valve 72 may be set at a cracking pressure of 0.5 psig, for example, so that when the pressure within the reactor vessel drops 0.5 psig below the pressure of the supplied quench gas, the quench gas is permitted to enter the reactor vessel 32.

It is to be understood that the process described above and shown in FIG. 13 may also be used to passively add one or more components to the reactor vessels at a predetermined pressure (as defined by the check valves 72) for reactions other than quenching.

Figure 14:
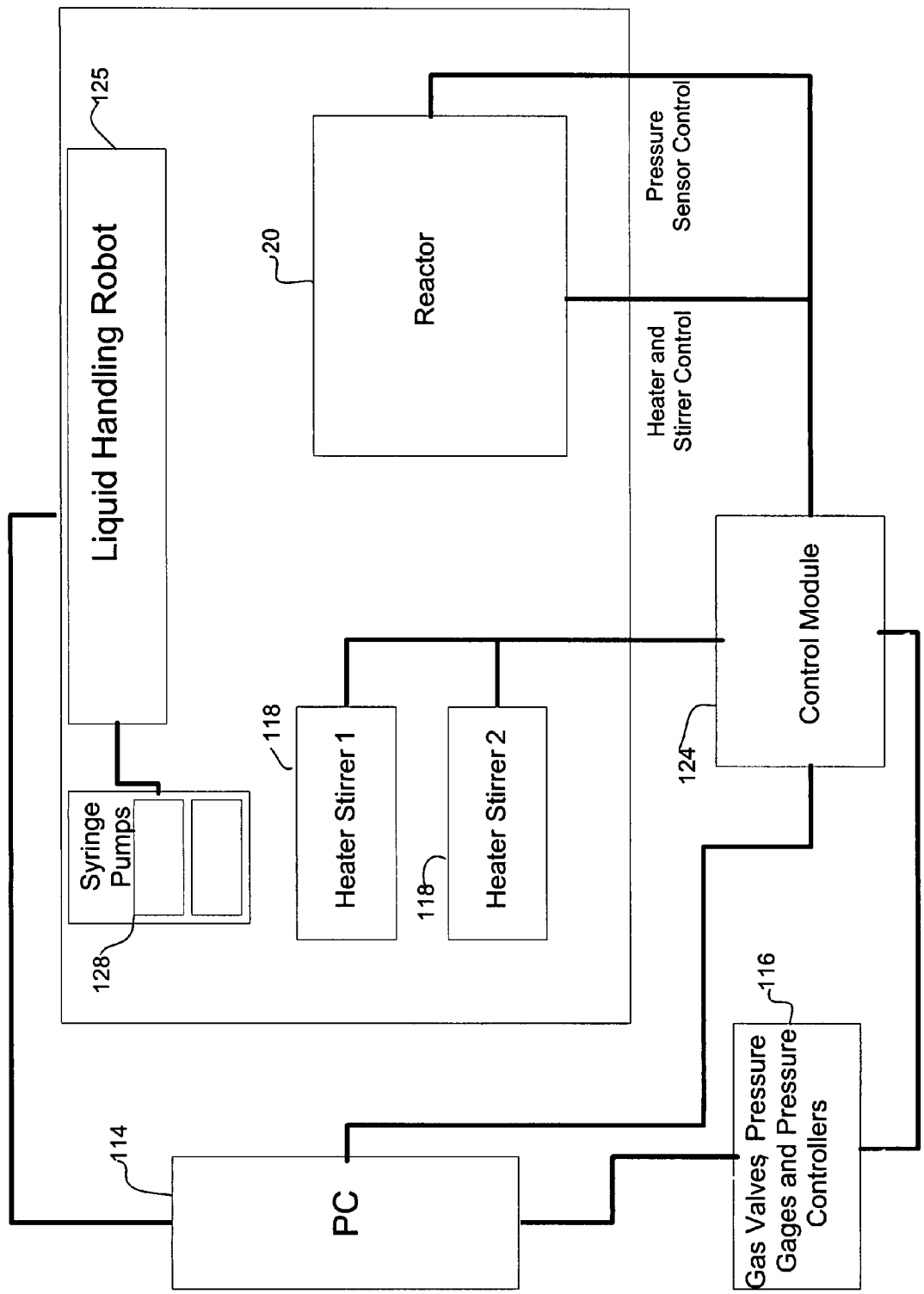
FIG. 14 is an electrical schematic of one embodiment of the reactor system.

FIG. 14 illustrates one example of an electrical schematic of a reactor system utilizing reactor 20. An application (e.g., software) may be used to configure and control the experiment and track results or perform diagnostics during the experiment. A personal computer (PC) 114 contains a user interface application that is used to enter parameters for the experiment. The PC 114 receives input from controllers and monitors 116 and a control module 124. These controllers and monitors are coupled to various sensors (e.g., pressure gages) and devices (e.g., heater/stirrer 118). The system may be configured to provide closed loop control of temperature and pressure, for example. The PC 114 may be used to preprogram control of the heater, stirrer, injection of chemical components, supply of source gas/pressure, and quenching, for example. The valves may also be operated manually.

A robotic system 125 may be used to inject measured amounts of chemical components into the vessels 32 via syringe pumps 128 as well as remove material from vessels to, for example, monitor the progress of the reaction by characterizing the material removed. The robotic system 125 may manipulate a probe which is optionally connected to one or more sources of reagents. A processor (e.g., PC 114) preferably controls the robotic system 125. The user supplies the processor with operating parameters using a software interface, such as described above. Typical operating parameters include the location of the vessels and the initial compositions of the reaction mixtures in the vessels. The initial compositions can be specified as lists of liquid reagents from each of the sources or incremental additions of various fluidic reagents relative to particular vessels 32.

Figure 15:
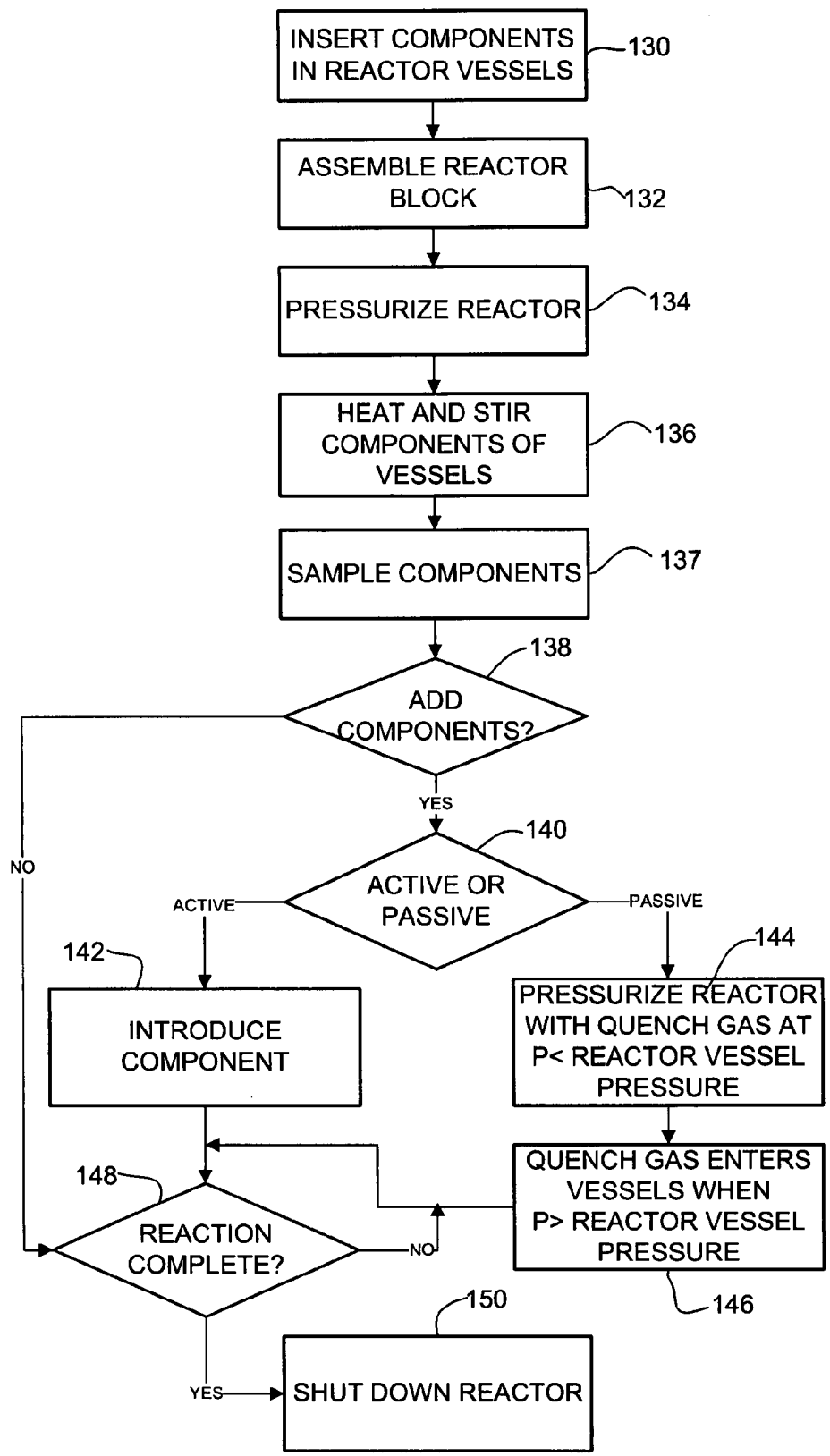
FIG. 15 is a flowchart illustrating one example of a process for screening reactions using the reactor of FIG. 1.

FIG. 15 is a flowchart illustrating one example of a workflow for the parallel batch reactor described herein. Prior to starting the experiment or screening, reactor vessels 32 are loaded into the vessel block 24 (if separate from the vessel block). The vessel block 24 is then attached to the pressure monitoring system and the stirring assembly 26, and the heating elements 58 (if required for the experiment) are placed in the vessel block. Reaction components are placed into the reaction vessels 32 (step 130). The components may include, for example, a solvent, scavenger, co-catalysts, activators, and other reagents (e.g., polymerizable monomer), etc. A stir bar may also be placed in one or more of the reactor vessels 32. In one embodiment, the composition of the material placed in each of the vessels 32 varies from one vessel to the next. The manifold 22 is then aligned and placed on the vessel block 24 (step 132). Bolts or other suitable fasteners are inserted into the aligned openings to attach the manifold 22 to the vessel block 24. O-rings, gaskets, or other seals may be used to provide a seal between the manifold 22 and vessel block 24. A supply line (not shown) is connected to a quick release coupling at the inlet port 50 and a fill valve is opened until the required pressure is reached within the reaction vessels 32 (step 134). The reactor vessels 32 may then be heated and stirred at a specified pressure until equilibrium is reached (step 136). Chemical components may be sampled from one or more of the reactor vessels through the sampling valve 74 (step 137), as described below.

If additional components are added to the reaction, the components may be added actively (i.e., supplying a fluid at the inlet port at a pressure above pressure within reactor vessels or injecting a component into the reactor vessels) or passively (i.e., supplying a fluid at the inlet port below the pressure within the reaction vessels and having the check valves open to allow fluid to enter reactor vessels when pressure within the reaction vessels drops below supply fluid pressure) (step 138).

If active addition is used, a gas (e.g., quench or process gas) is introduced via the gas manifold at a pressure higher than pressures within the reaction vessels 32, or a component (e.g., solution or reagent) is introduced through the injector valves 74 (step 142). The point in the reaction at which the component is introduced is determined based on one of the monitored parameters of the reaction such as pressure (e.g., pressure drop indicating uptake or conversion of a gaseous reagent such as a conversion of a gaseous, polymerizable monomer into a polymer), temperature, or time, or a measured characteristic or property of the sampled reaction mixture or a specified time after the start of the reaction. A pressure increase in a reaction vessel may also trigger a quench if a reaction involved production of a volatile product. A quench process may involve venting the reactor vessel and then injecting the quench fluid. For passive addition of components, the reactor block is pressurized with a gas at a pressure lower than the pre-equilibrated reaction vessel pressure (step 144). As the reaction progresses, the pressure within the reactor vessel 32 drops below the gas pressure and the gas passes through the check valves 72 and into the reactor vessels (step 146).

Anytime during this process, a number of parameters may be monitored, including, for example, pressure, temperature, viscosity, or optical properties. Also, fluid (e.g., headspace gas or reaction solution) may be sampled via the injector/sampling valve 74 using a sampling device such as a needle or probe. The sampling may be used to remove an aliquot of the reaction mixture itself (as a liquid or a slurry) or an aliquot of the headspace above the reaction mixture. The sampled material can be analyzed by a variety of spectroscopic, spectrometric, chromatographic methods, for example, to assess physical, mechanical, or rheological properties. The information obtained from sampling or monitoring may be used to monitor the kinetics of reactant consumption, product and by-product formation, and establish reaction selectivities, for example. The information may be used to trigger the one or more processes, such as the addition of reagents as solutions, slurries, or gases, or additional sampling. Gases may also be introduced through the inlet port (manifold) or through the injector valves 74. For example, process gases such as ethylene, propylene, butene, pentene, isobutene, butadiene, vinyl chloride, $H_2$, CO, $CO_2$, $N_2$, $Cl_2$, HCl, HBr, or quench gasses, such as $CO_2$, air, $O_2$, HCl, HBr, or any combination thereof may be used. This may be done as part of a serial or semi-continuous synthesis or process. The components may be added actively, passively, or a combination of active and passive addition of components may be used. The sampling or monitoring may also identify when to add a solution, slurry, or gas to quench the reaction, as previously described. The monitoring and sampling are preferably performed without disturbing the reaction. For example, the sampling may be performed after the supply of pressurized gas is stopped and while maintaining pressure within the pressurized reactor vessels (e.g., without causing a significant change in pressure within the reactor vessels). The monitoring or sampling may take place at any stage of the experiment and may be performed once, at set intervals, or any number of times during the reaction. The monitoring of one or more characteristics may also be continuous throughout the experiment.

After the reaction is complete a shutdown procedure is optionally performed (steps 148, 150). The stirring assembly and heating devices are turned off and the reactor is allowed to cool. The reactor vessels may be vented through the injector valves. The reactor block is opened and the reactor vessels 32 are removed from the vessel block 24.

It is to be understood that the process described above is only one example and that the order of the steps may be changed or steps eliminated or added, without departing from the scope of the invention. For example, more than one quench process may be performed and a combination of passive quench and active quench may be used. Also, for example, activators or scavengers may be added at a desired temperature or time. Catalysts (pre-catalysts) (activated or not activated) may be injected into pre-equilibrated reaction vessels or inserted initially into the reactor vessels and an activator or scavenger injected. The pre-catalyst may be supported on silica, magnesium chloride, polystyrene, or any other suitable material. Also, there may be any combination of reagents injected into the reactor vessels at specified times or conditions.

Figure 16:
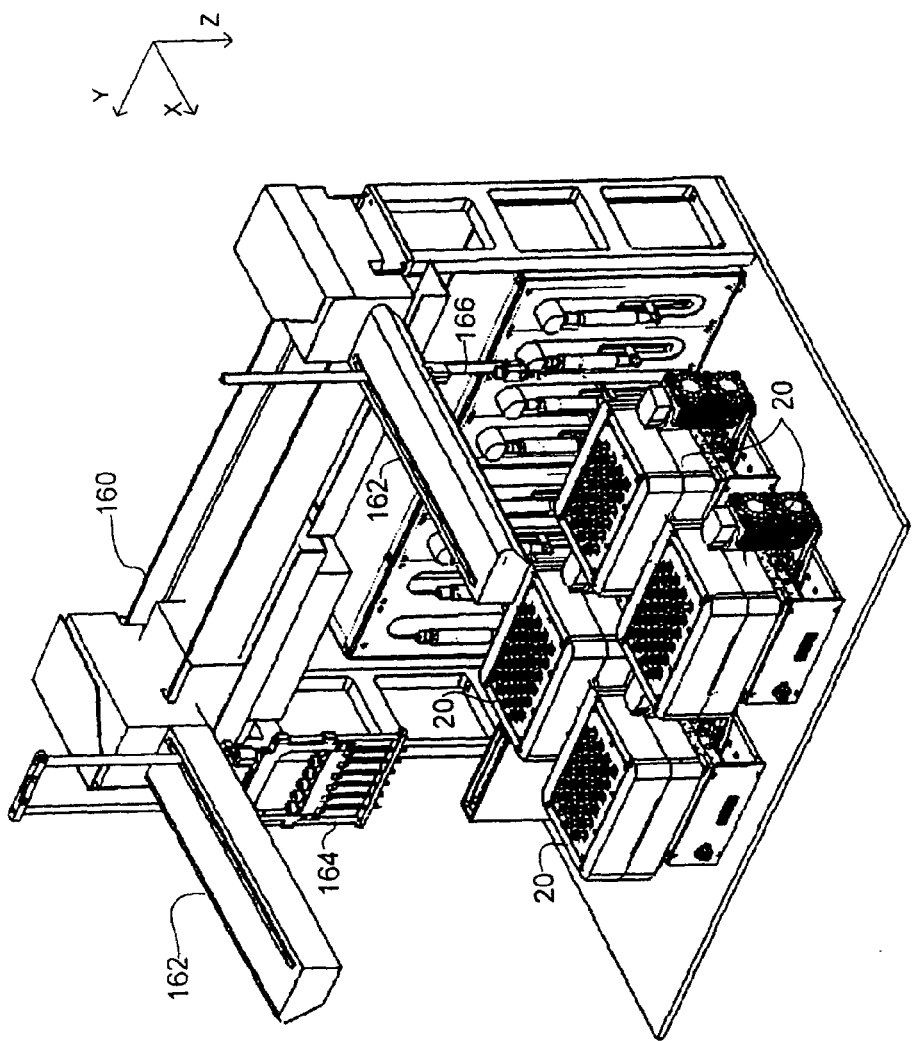
FIG. 16 is a perspective of a plurality of reactor vessels arranged for parallel operation.

The reactor 20 or reactor vessels 32 may be arranged and operated in a high-throughput fashion, that is, in rapid serial or parallel fashion (e.g., in a library or array format), as shown in FIG. 16, for example. In the example shown in FIG. 16, four 24-channel reactor modules are positioned adjacent to a fluid handling robotic system 160. The system shown thus defines an array of 96 experiments comprised of four arrays of twenty-four experiments. The robotic system 160 comprises two arms 162 movably mounted on a carriage (along a y-axis, as shown in FIG. 16). The arms 162 comprise a multi-channel injector 164 and a single channel injector 166, which are each movable in a longitudinal direction (x-axis) along the arm (to position the injector above a selected reactor vessel (or vessels)) and in a z-axis to insert the injector into the reactor vessel (or vessels). In the context of an experimental array, each of the plurality of reactors 20 or reactor vessels 32 may be the same or different from the others in the array. Such differences may be based on composition, processing parameters (e.g., temperature, pressure) or other differences.

Depending on the nature of the starting materials, types of reactions, and method used to characterize reaction products and rates of reaction, it may be desirable to enclose either the entire system or reactor block in a chamber (not shown). The chamber may be filled with an inert gas such as nitrogen or argon. The chamber may be a glove box or dry box.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for effecting chemical reactions in a parallel batch reactor comprising a plurality of reactor vessels and a plurality of valves configured to allow flow into the reactor vessels when a gas is supplied to the reactor at a pressure higher than a pressure within the reactor vessels and restrict flow from the reactor vessels, the method comprising:
   inserting chemical components into said plurality of reactor vessels;
   supplying a first gas to said plurality of reactor vessels to pressurize the reactor vessels;
   stopping supply of the first gas; and
   supplying a second gas to the reactor at a lower pressure than a pressure within the reactor vessels;
   wherein the second gas passes through said plurality of valves and into said plurality of reactor vessels when the pressure within the reactor vessels drops below the pressure of the second gas.

2. The method of claim 1 wherein the first gas is a process gas and the second gas is a quench gas.

3. The method of claim 1 wherein supplying a first gas comprises supplying the gas at a pressure above 15 psig.

4. The method of claim 1 wherein supplying a second gas comprises supplying the gas at a pressure above 15 psig.

5. The method of claim 1 further comprising stirring the chemical components inserted into the reactor vessels.

6. The method of claim 1 wherein stirring comprises utilizing magnetic stirring.

7. The method of claim 1 further comprising injecting a chemical component into one or more of the pressurized reactor vessels.

8. The method of claim 1 further comprising sampling fluid from at least one of the reactor vessels during the pressurized reaction.

9. The method of claim 1 further comprising heating said chemical components.

10. The method of claim 1 further comprising cooling said chemical components.

11. The method of claim 1 further comprising monitoring the pressure within the reactor vessels.

12. The method of claim 11 wherein monitoring the pressure comprises monitoring the pressure within the reactor vessels with a pressure sensor located external to the reactor vessels and fluid passageways in fluid communication with the reactor vessels.

13. The method of claim 1 wherein inserting chemical components comprises inserting chemical components with a movable injector arm coupled to a robotic system containing a plurality of the parallel batch reactors.

14. A method for effecting chemical reactions in a parallel batch reactor comprising a plurality of reactor vessels and a plurality of valves operable to supply pressurized fluid to the reactor vessels and fluidically isolate each of the reactor vessels, the method comprising:
   supplying a gas to the parallel batch reactor to pressurize the reactor vessels;
   stopping supply of the gas to fluidically isolate each of said plurality of reactor vessels;
   sampling chemical components from one or more of said pressurized reactor vessels; and
   performing one or more processes based on an analysis of said sampled chemical components, wherein performing one or more processes comprises supplying a second gas to said plurality of reactor vessels.

15. The method of claim 14 wherein said sampled chemical components comprise headspace gas from one or more of said plurality of reactor vessels.

16. The method of claim 14 wherein said sampled chemical components comprise reaction mixture from one or more of said plurality of reactor vessels.

17. The method of claim 14 wherein sampling chemical components comprises monitoring kinetics of reaction.

18. The method of claim 14 wherein performing one or more processes comprises injecting a chemical component into one or more of said plurality of reactor vessels.

19. The method of claim 14 wherein performing one or more processes comprises repeating sampling chemical components from one or more of said plurality of reactor vessels.

20. The method of claim 14 further comprising quenching one or more of the chemical reactions based on information obtained during sampling chemical components.

21. The method of claim 14 wherein said plurality of valves comprise check valves.

* * * * *